Feb. 10, 1953  H. C. DRAKE  2,628,335
ULTRASONIC RAIL FLAW DETECTOR SEARCH UNIT
Filed Aug. 10, 1950  2 SHEETS—SHEET 1
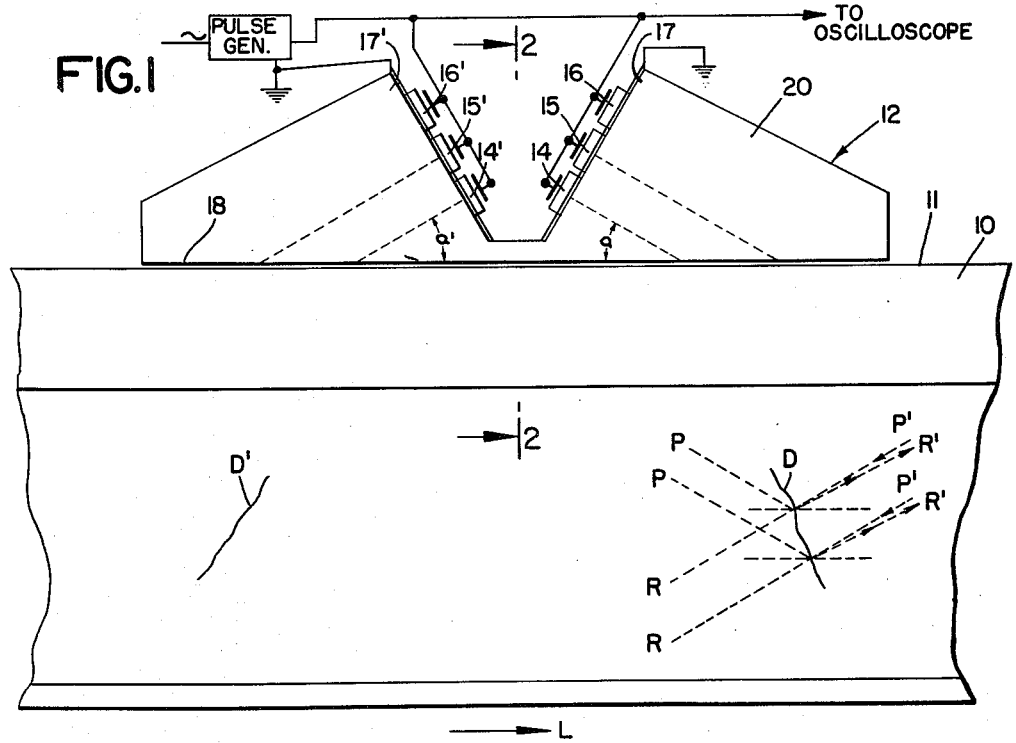
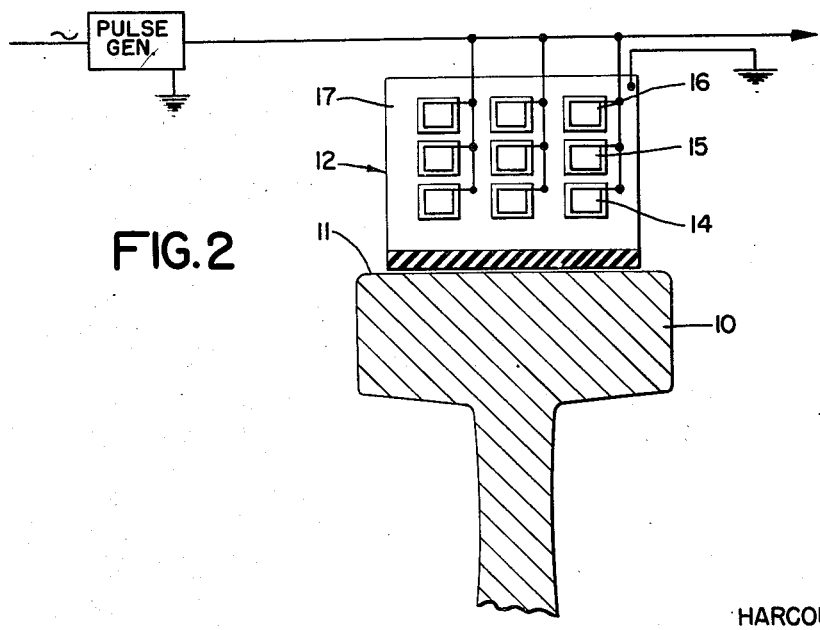
*INVENTOR.*
HARCOURT C. DRAKE
BY Joseph H. Lipschutz
ATTORNEY.

Feb. 10, 1953          H. C. DRAKE          2,628,335

ULTRASONIC RAIL FLAW DETECTOR SEARCH UNIT

Filed Aug. 10, 1950          2 SHEETS—SHEET 2

INVENTOR.
HARCOURT C. DRAKE

BY
*Joseph H. Lipschutz*
ATTORNEY.

Patented Feb. 10, 1953

2,628,335

UNITED STATES PATENT OFFICE 2,628,335

ULTRASONIC RAIL FLAW DETECTOR SEARCH UNIT

Harcourt C. Drake, Hempstead, N. Y., assignor to Sperry Products, Inc., Danbury, Conn., a corporation of New York Application August 10, 1950, Serial No. 178,626

6 Claims. (Cl. 318—114)

This invention relates to the testing of rails by ultrasonic means which comprises transmitting ultrasonic pulses into the rail at an angle to the tread surface thereof and indicating any back reflections which may be received, usually by the same transmitting element, from a reflecting surface within the rail caused by a defect. The pulses are transmitted into rail by means of an electro-acoustic transducer which may take the form of a piezo-electric element such as a quartz crystal. In such testing systems there is encountered the condition of internal fissures which may be located either in a vertical transverse plane or at various angles to such plane. It will be apparent that when the pulses are transmitted into the rail at a given angle it may occur that internal defects are located in such planes that the reflections of the pulse do not return to the transmitting and receiving crystal. In stationary testing systems it is possible at any given point to change the angle of transmission so as to effect a scanning action in the course of which certain of the transmitted pulses will strike the defect at such angle of incidence that the reflections of the pulses will be received by the transmitting and receiving crystal. However, in the continuous testing of rail, as, for instance, by an ultrasonic test car which moves continuously along the rail at a steady rate, such movement of the transmitting crystal is not feasible.

It is therefore one of the principal objects of this invention to provide an ultrasonic search unit which is capable of being employed on a test car moving continuously in a given direction and which will nevertheless receive reflections of the pulse from substantially all internal reflection surfaces regardless of their angular position.

Further objects and advantages of this invention will become apparent in the following detailed description thereof.

In the accompanying drawings,

Fig. 1 is a side elevation of a piece of rail showing one embodiment of my search unit applied thereto.

Fig. 2 is a vertical section taken substantially on the line 2—2 of Fig. 1.

Figure 3:
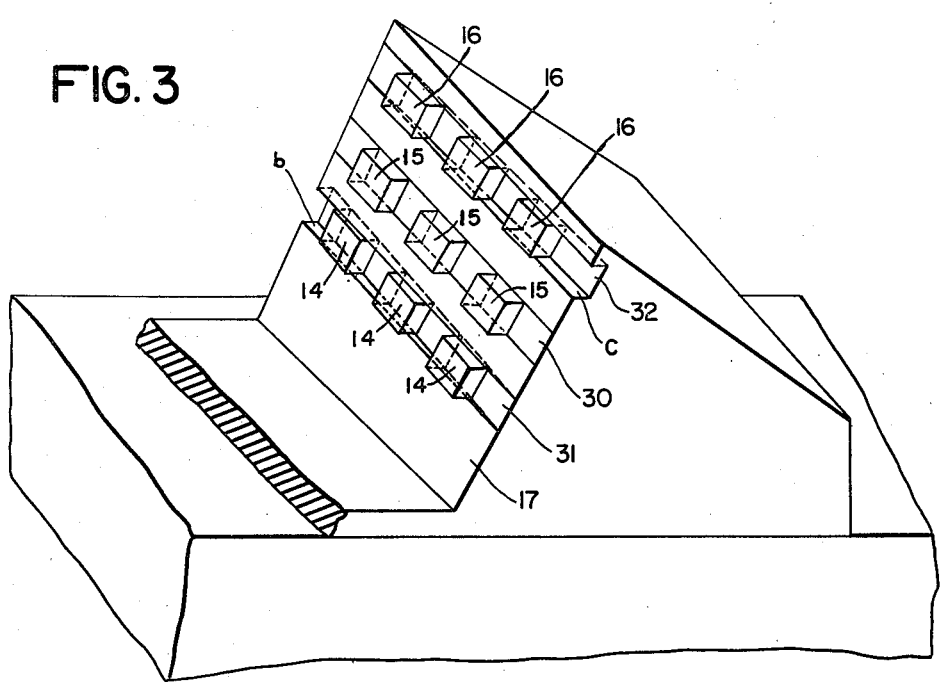
Fig. 3 is an isometric projection of a modified form of search unit.

Referring to Fig. 1 there is disclosed a portion of a rail 10 on the tread surface 11 of which there is adapted to be moved continuously in a given direction the ultrasonic search unit indicated generally at 12. This unit may comprise one or a series of piezo-electric elements in the form of quartz crystals 14, 15, 16 connected in parallel to a pulse generator energized periodically from a suitable source such as 60-cycle A. C. All of the crystals will thus be simultaneously and periodically energized. These crystals may be mounted on a face 17 of the search unit 12, said face being inclined from the vertical in the plane of the longitudinal axis of the rail. The search unit is provided with a face 18 adapted to ride on the rail tread surface 11. The face 17 is inclined at such angle that the transmitters 14, 15, and 16 when energized by ultrasonic pulses will transmit said pulses through the supporting block 20 of the search unit 12 at an angle $a$ to the tread surface. Under these conditions if the pulses transmitted by crystals 14, 15, and 16 strike a defect within the rail, and said defect is positioned so that the pulses strike the defect substantially normally, the reflection of these pulses will be received by one or more of the crystals 14, 15, and 16. Since these crystals are connected in parallel, if any one of them is energized by the returning reflections the presence of such reflection will be indicated on any suitable receiver indicator.

However, if a defect is located in such plane that the transmitted pulses are not incident substantially normally to the surface of the defect then the reflections will not return in sufficient strength to the transmitting crystals. Thus as shown in Fig. 1 if the defect D is located as shown the incident pulses P will be reflected in a direction R away from the crystals rather than in a direction to return to the crystals. To overcome this difficulty, bearing in mind that in a continuously moving ultrasonic test apparatus is not feasible to change the angles of transmission of crystals 14, 15, and 16, I provide an additional surface 17' inclined from the vertical in the plane of the longitudinal axis of the rail, preferably in the same block 20 of the ultrasonic search unit. The direction of the angle of inclination of surface 17' with respect to the vertical is opposite to the direction of inclination of surface 17. The effect of this would be that as the car proceeds in the direction of the arrow L in Fig. 1, the pulses from crystals 14', 15', 16', will be transmitted at the angle $a'$ into the rail and the reflections R' of these pulses P' will be returned so as to be received by the same crystals which transmitted the pulses. The crystals 14', 15', 16' are connected in parallel to the same pulse generator as crystals 14, 15, 16. Thus in the case of a defect D which is positioned at an angle of inclination such as indicated in Fig. 1 the crystals 14, 15, 16, would probably not detect the presence of such defect but the crystals 14', 15', 16', would detect such defect. The opposite condition would prevail in the case of a defect D' inclined in a direction opposite to defect D. In this case the defect D' would be detected by crystals 14, 15, 16, but would probably not be picked up by crystals 14', 15', 16'.

Figure 4:
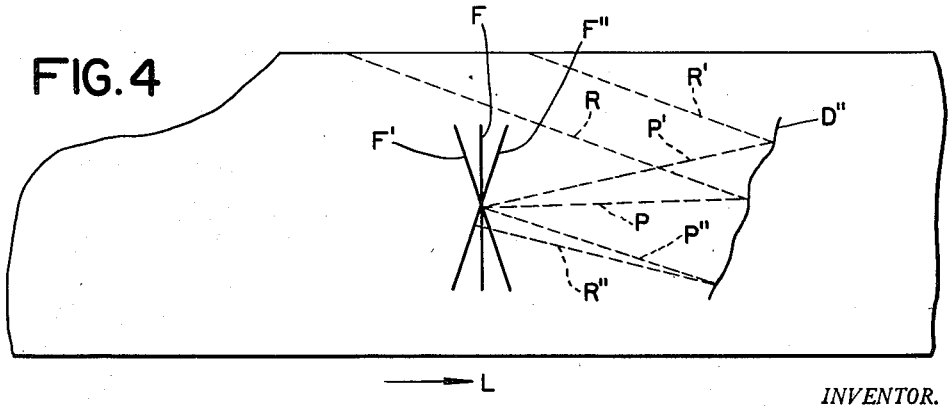
Fig. 4 is a plan view of a section of rail showing diagrammatically the theory of the Fig. 3 form of the invention.

Even though a defect may be located in a plane that is exactly vertical rather than inclined to the vertical such as defects D and D', it may nevertheless be the case that the reflections of the transmitted pulses would not be picked up by the transmitting crystals if the plane of the defect were inclined at an angle other than 90° with respect to the longitudinal axis of the rail. Thus referring to Fig. 4 a defect D" in a vertical plane but said plane inclined at an angle other than 90° with respect to the longitudinal axis of the rail, would reflect pulses P from crystals situated in plane F so as to direct reflections R out of the range of the transmitting and receiving crystals. Similarly pulses P' from crystals situated in plane F' would result in reflections R' out of the range of said transmitting and receiving crystals. However, pulses P" from crystals arranged in plane F" would result in reflections R" being received by the transmitting and receiving crystals. Therefore, if sets of transmitting and receiving crystals could be arranged not only in plane F which is exactly transverse to the longitudinal axis L of the rail, but also in planes F' and F" each arranged at an angle to plane F but in opposite directions, then at least one set of crystals will receive the reflections from a transverse defect no matter how the plane of said defect is inclined with respect to the transverse plane.

To provide an arrangement which will perform the function described in the preceding paragraph, I may provide in the faces 17 and 17' of block 20 three separate planes for the three sets of crystals. The set of crystals 15 would be positioned exactly transverse to the longitudinal axis of the rail on section 30 of face 17. Crystals 14 would be positioned on face 31 inclined at an angle b with respect to the face 17. The crystals 16 would be positioned in a section 32 inclined at an angle c in a direction opposite to the direction of angle b with respect to the transverse plane. Thus there would be obtained three planes of transmitting and receiving crystals corresponding to the planes F, F', F" in Fig. 3. Face 17' would be similarly provided with three sections corresponding to sections 30, 31 and 32.

The block 20 may be of any suitable material having the proper degree of acoustic impedance. One such material is methyl methacrylate.

Having described my invention, what I claim and desire to secure by Letters Patent is:

1. An ultrasonic rail test search unit comprising supporting means adapted to be moved along the rail, a plurality of electro-acoustic transducers for transmitting pulses and receiving reflections thereof, a pulse generator, means whereby said pulse generator energizes all of said transducers simultaneously, said supporting means having means for supporting certain of said transducers for transmission and reception of pulses at an angle to the rail tread surface in a given direction, said supporting means having means for supporting certain other of said transducers for transmission and reception of pulses at an angle to the rail tread surface in a different direction.

2. An ultrasonic rail test search unit comprising supporting means adapted to be moved along the rail, a plurality of electro-acoustic transducers for transmitting pulses and receiving reflections thereof, a pulse generator, means whereby said pulse generator energizes all of said transducers simultaneously, said supporting means having means for supporting certain of said transducers for transmission and reception of pulses at an angle to the rail tread surface in a given direction, said supporting means having means for supporting certain other of said transducers for transmission and reception of pulses at an angle to the rail tread surface in an opposite direction.

3. An ultrasonic rail test search unit comprising supporting means adapted to be moved along the rail, said supporting means having a plurality of surfaces inclined with respect to a plane at right angles to the longitudinal axis of the rail, said surfaces being inclined in different directions with respect to said plane, electro-acoustic transducers in engagement with said inclined surfaces, a pulse generator, and means whereby said pulse generator energizes all of said transducers simultaneously.

4. An ultrasonic rail test search unit comprising supporting means adapted to be moved along the rail, said supporting means having a plurality of surfaces inclined with respect to a plane at right angles to the longitudinal axis of the rail, said surfaces being inclined in opposite directions with respect to said plane, electro-acoustic transducers in engagement with said inclined surfaces, a pulse generator, and means whereby said pulse generator energizes all of said transducers simultaneously.

5. An ultrasonic rail test search unit comprising supporting means adapted to be moved along the rail, said supporting means having a plurality of surfaces inclined with respect to a plane at right angles to the longitudinal axis of the rail, said surfaces being inclined in opposite directions with respect to said plane, each of said surfaces having sections inclined in different directions with respect to a horizontal axis transverse of the rail, a plurality of piezo-electric elements in engagement with said sections, a pulse generator, and means whereby said pulse generator energizes all of said elements simultaneously.

6. An ultrasonic rail test search unit comprising supporting means adapted to be moved along the rail, said supporting means having a plurality of surfaces inclined with respect to a plane at right angles to the longitudinal axis of the rail, said surfaces being inclined in opposite directions with respect to said plane, each of said surfaces having sections inclined in opposite directions with respect to a horizontal axis transverse of the rail, a plurality of piezo-electric elements in engagement with said sections, a pulse generator, and means whereby said pulse generator energizes all of said elements simultaneously.

HARCOURT C. DRAKE.

REFERENCES CITED

The following references are of record in the file of this patent:

UNITED STATES PATENTS

| Number | Name | Date |
|---|---|---|
| 2,416,314 | Harrison | Feb. 25, 1947 |
| 2,463,328 | Sproule | Mar. 1, 1949 |
| 2,505,867 | Meunier | May 2, 1950 |
| 2,536,128 | Firestone | Jan. 2, 1951 |
| 2,545,309 | Roberts | Mar. 13, 1951 |